United States Patent
Bonchi

(10) Patent No.: US 9,779,169 B2
(45) Date of Patent: Oct. 3, 2017

(54) SYSTEM FOR RANKING MEMES

(75) Inventor: Francesco Bonchi, Barcelona (ES)

(73) Assignee: Yahoo Holdings, Inc., Sunnyvale, CA (US)

(*) Notice: Subject to any disclaimer, the term of this patent is extended or adjusted under 35 U.S.C. 154(b) by 637 days.

(21) Appl. No.: 12/965,369

(22) Filed: Dec. 10, 2010

(65) Prior Publication Data
US 2012/0150957 A1   Jun. 14, 2012

(51) Int. Cl.
| | |
|---|---|
| *G06F 15/16* | (2006.01) |
| *G06F 17/30* | (2006.01) |
| *G06Q 50/02* | (2012.01) |
| *G06Q 50/00* | (2012.01) |
| *G06Q 10/10* | (2012.01) |

(52) U.S. Cl.
CPC .. *G06F 17/30867* (2013.01); *G06F 17/30864* (2013.01); *G06Q 50/01* (2013.01); *G06Q 50/02* (2013.01); *G06Q 10/10* (2013.01); *G06Q 10/107* (2013.01)

(58) Field of Classification Search
CPC ... G06F 17/30867; G06Q 50/01; G06Q 30/02
USPC ....... 726/9, 7, 3, 28, 27, 26, 21, 1; 715/751, 715/747; 709/223, 231, 229, 227, 226, 709/224, 220, 219, 230, 225, 206; 707/769, 748, 736, 722, 794, 765, 709
See application file for complete search history.

(56) References Cited

U.S. PATENT DOCUMENTS

| | | | |
|---|---|---|---|
| 2005/0159998 A1* | 7/2005 | Buyukkokten | G06Q 50/01 705/319 |
| 2007/0214097 A1* | 9/2007 | Parsons | G06F 17/30864 706/12 |
| 2008/0209320 A1* | 8/2008 | Mawhinney | G06F 17/30905 715/700 |
| 2008/0306935 A1* | 12/2008 | Richardson | H04L 51/32 |
| 2009/0119173 A1* | 5/2009 | Parsons | G06Q 10/107 705/319 |
| 2009/0192896 A1* | 7/2009 | Newton | G06Q 30/0224 705/14.25 |

(Continued)

OTHER PUBLICATIONS

Bonchi F, Castillo C, Ienco D. Meme ranking to maximize posts virality in microblogging platforms. Journal of Intelligent Information Systems. Apr. 1, 2013;40(2):211-39.*

(Continued)

*Primary Examiner* — Ranodhi Serrao
*Assistant Examiner* — James Fiorillo
(74) *Attorney, Agent, or Firm* — Weaver Austin Villeneuve & Sampson LLP

(57) ABSTRACT

Disclosed are methods and apparatus for selecting items (e.g., Internet memes) to be presented to a user. In one embodiment, a user connected to a network is identified. For each of a plurality of items (e.g., memes), for each of one or more followers of the user, a probability that the corresponding one of the followers of the user will repost the one of the plurality of items is determined. A number of the plurality of items may be selected based, at least in part, on the probability that has been determined, for each of the plurality of items, for each of the one or more followers of the user, that the corresponding one of the followers of the user will repost the one of the plurality of items. The selected number of the plurality of items may then be presented to the user.

30 Claims, 4 Drawing Sheets

(56) References Cited

U.S. PATENT DOCUMENTS

| | | | | |
|---|---|---|---|---|
| 2009/0307057 | A1* | 12/2009 | Azout | G06Q 30/02 705/7.29 |
| 2010/0169234 | A1* | 7/2010 | Metzger | G06Q 10/067 705/348 |
| 2010/0268661 | A1* | 10/2010 | Levy | G06Q 30/02 705/347 |
| 2011/0145160 | A1* | 6/2011 | Hajiaghayi | G06Q 10/06395 705/319 |
| 2011/0320284 | A1* | 12/2011 | Tennenholtz | G06Q 30/02 705/14.69 |
| 2012/0102021 | A1* | 4/2012 | Hill | G06F 17/30964 707/711 |
| 2013/0018968 | A1* | 1/2013 | Pennacchiotti | G06Q 10/10 709/206 |
| 2013/0232263 | A1* | 9/2013 | Kelly | H04L 43/10 709/224 |
| 2014/0177813 | A1* | 6/2014 | Leeds | H04M 3/02 379/67.1 |
| 2017/0109360 | A1* | 4/2017 | Hill | G06F 17/3079 |

OTHER PUBLICATIONS

Ienco D, Bonchi F, Castillo C. The meme ranking problem: Maximizing microblogging virality. InData Mining Workshops (ICDMW), 2010 IEEE International Conference on Dec. 13, 2010 (pp. 328-335). IEEE.*

Baeza-Yates, et al. "Modern Information Retrieval", Addison Wesley, May 1999, 38 pgs.

Bakshy, et al., "Social influence and the diffusion of user-created content", In Proc. of the 10th ACM Conf. on Electronic Commerce (EC'09), 10 pgs.

Cha, et al., "Measuring User Influence in Twitter: The Million Follower Fallacy", In Proc. of the Fourth International AAAI Conference on Weblogs and Social Media (ICWSM '10), 8 pgs.

Domingos, et al., "Mining the network value of customers", In Proc. of the 7th ACM SIGKDD Int. Conf. on Knowledge Discovery and Data Mining (KDD'01), 10 pgs.

Goyal, et al., "Learning influence probabilities in social networks", In Proc. of the 3rd ACM Int. Conf. on Web Search and Data Mining (WSDM 2010), 10 pgs.

Java, et al., "Why we twitter: understanding microblogging usage and communities", In Proc. of SNA-KDD 2007 Workshop, 10 pgs.

Kempe, et al., "Maximizing the spread of influence through a social network", In Proc. of the 9th ACM SIGKDD Int. Conf. on Knowledge Discovery and Data Mining (KDD'03), 10 pgs.

Leskovec, et al., "Meme-tracking and the dynamics of the news cycle", In Proc. of the 15th ACM SIGKDD Int. Conf. on Knowledge Discovery and Data Mining (KDD'09), 9 pgs.

Leskovec, et al., "Graphs over time: densification laws, shrinking diameters and possible explanations", In Proc. 11th ACM SIGKDD Int. Conf. on Knowledge Discovery and Data Mining (KDD'05), 11 pgs.

Mislove, et al., "Measurement and analysis of online social networks", In Proc. of the 7th ACM SIGCOMM Conf. on Internet measurement (IMC'07), 14 pgs.

Richardson, et al., "Mining knowledge-sharing sites for viral marketing", In Proc. of the Eighth ACM SIGKDD Int. Conf. on Knowledge Discovery and Data Mining (KDD'02), 10 pgs.

Weng, et al., "Twitterrank: Finding topic-sensitive influential twitterers", In Proc. of the 3rd ACM Int. Conf. on Web Search and Data Mining (WSDM 2010), 10 pgs.

Wu, et al., "Information flow in social groups", Physica A: Statistical and Theoretical Physics, 337(1-2):327-335, Jun. 2004, 5 pgs.

* cited by examiner

SYSTEM FOR RANKING MEMES

BACKGROUND OF THE INVENTION

The disclosed embodiments relate generally to methods and apparatus for selecting or ranking items such as Internet memes to present to a user.

Microblogging is a modern communication paradigm in which users post bits of information that are visible by their communities. For example, the information that is posted may include brief text updates or micromedia such as images (e.g., photos), video or audio clips. Such a posting may be referred to as an Internet meme.

The term "Internet meme" may be used to generally describe a concept that spreads via the Internet. At its most basic, an Internet meme may be the propagation of a digital file or hyperlink from one person to others using methods available through the Internet, such as electronic mail (email), blogs, social networking sites, and instant messaging. The term may also refer to the content that spreads from user to user, the idea behind the content, or the phenomenon of its spread.

When a user finds an Internet meme of another user interesting, the user can eventually repost it, thus allowing Internet memes to propagate virally through a social network. An Internet meme may stay the same each time it is reposted, or the Internet meme may evolve over time.

SUMMARY OF THE INVENTION

The disclosed embodiments enable items such as Internet memes to be selected for presentation to a particular user. The Internet memes that are selected may be those that are most likely to maximize the viral propagation of Internet memes through a social network. This may be accomplished by selecting Internet memes that have a high likelihood of being posted (or reposted) by the user, as well as a high likelihood of being reposted by the user's follower(s).

The items (e.g., Internet memes) that may be selected for presentation to a user may include various types of items. More particularly, the items may include one or more digital files or hypertext links. Moreover, the items may include text, image(s), audio clip(s) or video clip(s).

In accordance with one aspect, a user connected to a network is identified. More particularly, the user may be identified when the user logs in to the network. A set of items such as Internet memes may be selected for the user prior to or after the user logs in to the network. The selected set of items may then be presented to the identified user.

In accordance with another aspect, those items that are presented to the user may be selected, at least in part, on the likelihood of the user posting (or reposting) the items. More particularly, the items that are selected for presentation to the user may be items that have a high probability of being posted (or reposted) by the user.

In accordance with yet another aspect, the items that are presented to the user may be further selected, at least in part, on the likelihood of followers of the user reposting the items. For each of a plurality of items (e.g., Internet memes), for each of one or more followers of the user, a probability that the corresponding one of the followers of the user will repost the one of the plurality of items may be determined. A number of the plurality of items may be selected based, at least in part, on the probability that has been determined, for each of the plurality of items, for each of the one or more followers of the user, that the corresponding one of the followers of the user will repost the one of the plurality of items. More particularly, a number of the plurality of items may be selected based, at least in part, on an average probability, for each of the plurality of items, that the one or more followers of the user will repost the corresponding one of the plurality of items (e.g., Internet memes). The selected number of the plurality of Internet memes may then be presented to the user.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

The disclosed embodiments enable items that are capable of being "posted" (and re-posted) to be selected and/or ranked for presentation to a particular user. These items will be referred to herein as Internet memes. The selection and/or ranking of these items may be determined based, at least in part, on the likelihood that followers of the user will repost the corresponding items. Accordingly, the disclosed embodiments may maximize the global "virality" of the selected memes.

A user may post (or repost) an item by publicizing the item on the Internet. This may be accomplished by publishing, placing or otherwise displaying an item such as an Internet meme on the Internet. Posting an Internet meme may result in the ability of users of the Internet or a segment of the users of the Internet to access the Internet meme.

Another user accessing the Internet meme may thereafter choose to repost the Internet meme.

A segment of users of the Internet having access to Internet memes of a user may be referred to as "followers" of the user. A follower of a user may follow opinions or other postings of the user. This may be accomplished via a particular website of which both the follower and the user are members. The user and/or follower may opt-in or opt-out of a one-way or two-way relationship with one another, enabling the follower to view or otherwise access Internet memes posted by the user.

Figure 1:
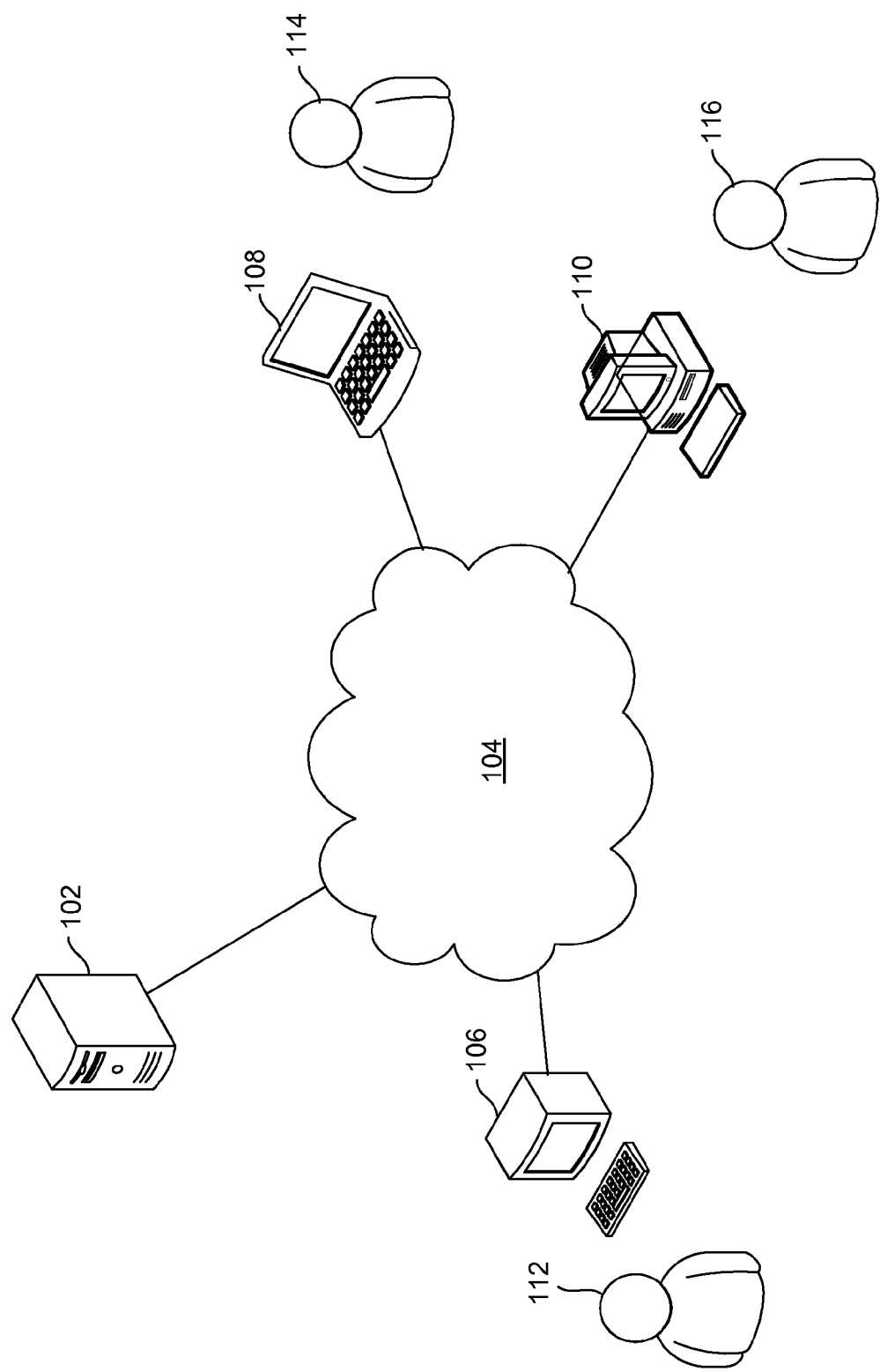
FIG. 1 is a diagram illustrating an example system in which embodiments of the invention may be implemented.

FIG. 1 is a diagram illustrating an example system in which embodiments of the invention may be implemented. As shown in FIG. 1, the system may include one or more servers 102 associated with a web site such as a social networking web site. Examples of social networking web sites include Yahoo, Facebook, Tumblr, LinkedIn, and Meme. The server(s) 102 may enable the web site to provide a variety of services to its users. In addition, the web site may automatically select and/or rank items such as Internet memes to be provided to its users. For example, a plurality of Internet memes may be presented to a user when the user logs in to the web site. In this example, the server(s) 102 may obtain or otherwise receive data (e.g., account data and/or user profile) and/or requests (e.g., search requests) via the Internet 104 from one or more computers 106, 108, 110 in association with corresponding entities 112, 114, 116, respectively. For example, each of the entities 112, 114, 116 may be an individual, a group of individuals (e.g., group, business or company), or other entity such as a web site. However, in order to simplify the description, the disclosed embodiments will be described with reference to individuals that are users of the web site.

The server(s) 102 may enable the users 112, 114, 116 to submit search queries via a search engine, generate/modify a profile that defines or represents features of that user, and/or update account data for the user. The account data may include information pertaining to the user's previous purchases, as well as other personal information such as residence address, gender, age, etc. Therefore, the account data may be automatically updated to include information pertaining to the user's purchases. A user's profile may be available to the general public, to those that are members of the web site, and/or to a specific category of those members of the web site. A search request may be a search for a document, web site, web page, an individual, etc.

The disclosed embodiments enable Internet memes to be selected and/or ranked for presentation to a particular user, as will be described in further detail below. More particularly, the server(s) 102 may automatically select and/or rank a set of Internet memes for any of users 112, 114, 116 based at least in part on the likelihood that followers of the corresponding user will repost the corresponding items. Example methods of selecting and ranking Internet memes for a particular user and their followers will be described in further detail below. The server(s) 102 may store these selected and/or ranked Internet memes for a particular user in a database, or generate and provide them on an as-needed basis.

Microblogging is a well-established social communication medium in which users share short snippets of text, images, sounds or videos ("memes" in the following) with others users. Many social networking platforms such as Twitter, Facebook, Tumblr, LinkedIn, Meme, etc., offer microblogging features, although there are minor differences among them, e.g., in the types of meme that can be posted, and major differences in the way people provide feedback to each other (comments, votes, favorites, etc.) and in the way social connections are established (one-way or two-way, with users opting-in or opting-out to being followed by another user). Despite the various differences between the different social networking platforms, the basic mechanics for sharing memes are the same. More particularly, a user posts a meme. If other users like the meme, they repost it, and by a process of virality, a large number of users can potentially be reached by a particular meme In accordance with various embodiments, a set of memes are selected to present to a user. More particularly, the disclosed embodiments enable a set of k memes to be selected for a particular user and presented to the user (e.g., when the user logs into the network). The process of selecting a set of memes for a particular user may be referred to as "meme ranking"

While many systems attempt to select items to present to a user, the items are typically selected based upon the preferences of the user. While it may be desirable to maximize the number of these memes that the user is likely to repost, various embodiments instead maximize the global "virality" of the selected memes. More particularly, the k memes may be selected based upon two criteria: 1) the likelihood that the user will post or repost a given meme; and 2) the likelihood that followers of the user will be repost a given meme posted by the user, thus recursively propagating the meme. Moreover, the k memes may be selected via application of the selection process further (e.g., recursively) to followers of the followers, etc. For example, the selection process may be further based upon the likelihood that followers of followers of the user will be interested and possibly repost a given meme. This may be accomplished by analyzing a propagation tree representing post/repost probabilities of various users and their followers in association with particular items.

Suppose a user receives 1$ for each repost of her memes by her followers, by the followers of her followers, and so on recursively. One objective of the meme ranking problem may be to maximize the user's profit. Stated a bit more formally, an objective of the meme ranking problem may be to maximize the size of the meme propagation sub-trees rooted in the user. The rationale for this objective is twofold. From the general perspective of the network, the virality of memes and thus the total number of reposts may be maximized, thereby maximizing the total level of activity of the network, i.e., its vitality. From the user perspective, receiving many reposts might be gratifying, thus enhancing the user's sense of belonging to a community and her engagement with the microblogging network.

Finding an optimal set of memes to present to a particular user (i.e, meme ranking) is a complex problem. Therefore it is useful to implement heuristics to solve this problem. Moreover, it may be desirable to perform meme ranking on-line, at each timestamp and for all the users. Therefore, the heuristics are preferably light-weight, thus efficient and scalable.

Figure 2:
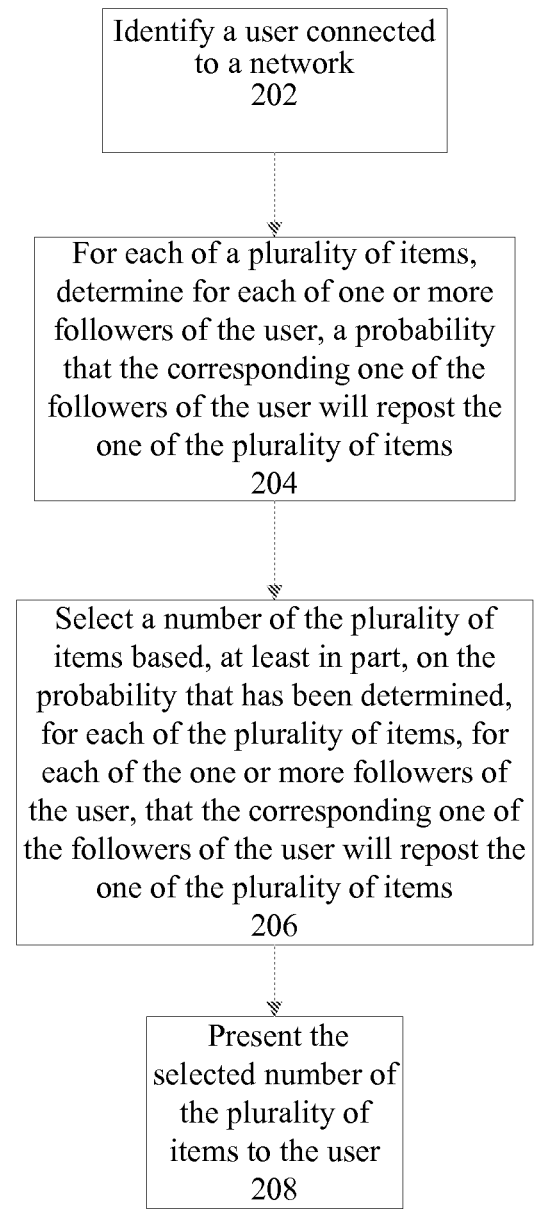
FIG. 2 is a process flow diagram illustrating an example method of ranking memes in accordance with various embodiments.

FIG. 2 is a process flow diagram illustrating an example method of performing meme ranking in accordance with various embodiments. The system may identify a user connected to a network such as a social network at 202. More particularly, the system may identify the user when the user logs in to the network.

In accordance with various embodiments, items such as Internet memes may be selected for presentation to the user based, at least in part, on the probability that the selected items will be reposted by at least a subset of followers of the user. More particularly, for each of a plurality of items, the system may determine for each of one or more followers of the user, a probability that the corresponding one of the followers of the user will repost the one of the plurality of items at 204. If the user has a plurality of followers, the system may determine such a probability for each of the plurality of followers of the user, or only a subset of the plurality of followers of the user. The system may select a number of the plurality of items at 206 based, at least in part, on the probability that has been determined, for each of the plurality of items, for each of the one or more followers of the user, that the corresponding one of the followers of the user will repost the one of the plurality of items. For example, a subset of the plurality of items may be selected based, at least in part, on an average probability, for each of the plurality of items, that the one or more followers of the user will repost the corresponding one of the plurality of items.

In accordance with various embodiments, the items may be further selected for presentation to the user based, at least in part, on the probability that the user will post (or repost) items that are presented to the user. More particularly, for each of the plurality of items, the system may determine a probability that the user will post (or repost) the one of the plurality of items. Therefore, the number of the plurality of items may be selected, based at least in part, on the probability, for each of the plurality of items, that the user will post (or repost) the one of the plurality of items, as well as the probabilities that have been determined for the one or more followers of the user.

The system may then present the selected number of the plurality of items to the user at 208. More particularly, the system may display the selected items to the user when the user logs in to the network. As described above, the network may be a social network.

A social network may be modeled as a followed-follower graph, i.e., a directed graph $G=(V, E)$, where an arc $(u, v) \in E$ represents the fact that user v is a follower of user u. We represent by M the set of all memes. We can model the interestingness of a meme for a user as a function interest: $M \times V \to [0, 1]$. Moreover for each arc $(u, v) \in E$ we can model the influence exerted by user u on her follower v as the probability of v re-tweeting some meme of u: influence: $V \times V \to [0, 1]$.

In our meme propagation model, time may unfold deterministically in discrete steps. If a user u posts a meme m at time t, whether a new post or a repost, we can denote this event by the predicate post(u, m, t). Similarly, we can use the predicate repost(v, u, m, t) to denote that v reposted m "via" u. We next define the probability of the event repost(v, u, m, t). Denoting by T the temporal domain, we can generate a computable function p: $M \times V \times V \times T \to [0, 1]$. This function may be derived by means of data mining methods over the past propagation logs recorded by one or more microblogging systems (e.g., implemented by one or more social networks). From the propagation logs, we can learn from the past evidence of the propagations, the identities of the influential users, as well as the probability of one user reposting a meme of another user.

The probability of a follower v of user u reposting a meme of user u may depend on a variety of factors. In accordance with various embodiments, the probability of a follower v reposting a meme of user u depends on factors such as the influence exerted by user u on her follower v, the topic-interestingness of meme m for the follower v, and/or elapsed time (i.e., time that has elapsed since the meme m was posted by the user u).

In accordance with one embodiment, the meme rank is a function ϕ that at each timestamp t selects the top-k memes to show to the follower v from a set of candidates memes cand(v, t). We denote the set of selected memes as ϕ(v, t). The set of candidate memes is the union of all memes previously posted by users in V that are followed by v, i.e., $$in(v,t)=\{m \in M | post(u,m,t') \wedge (u,v) \in E \wedge t'<t\}.$$

From in(v, t) we may subtract the memes previously presented to v, or previously posted by v. That is:

$$cand(v,t)=in(v,t) \setminus \{m \in M | post(v,m,t') \vee \phi(v,t')\}.$$

Repost Probabilities

In one embodiment, the repost probability (e.g., the probability that a follower v will repost a meme m) may be computed as a function of time, interest and influence. The repost probability may be determined for each user (and therefore followers of the user) of a network and stored in a database. The repost probability may be ascertained from a log of past meme propagations, as will be described in further detail below.

Interest

The system may determine a probability for a user, for each of a plurality of items, that the user will repost the one of the plurality of items based, at least in part, on a likelihood that the user will be interested in the one of the plurality of items. The system may therefore determine a probability for the user, for each of the plurality of items, that the user will be interested in the particular item.

In addition, the system may determine a probability for each of one or more followers of the user, for each of the plurality of items, that the corresponding one of the followers of the user will repost the one of the plurality of items based, at least in part, on a likelihood that the one of the followers of the user will be interested in the one of the plurality of items. Thus, the system may determine a probability for each of one or more followers of the user, for each of the plurality of items, that the corresponding follower of the user will be interested in the particular item.

The interest of a follower (or user) in a particular item (e.g., meme) may be determined using a variety of heuristics. In accordance with various embodiments, the interest (m, v) of each user (e.g., follower) v for each meme m may be computed. More particularly, each meme m may be represented as a bag-of-words—considering all the words in its text, or, in the case of images or multimedia files, all the tokens in the URL of the meme. In addition, each user v may be represented as a concatenation of the bags-of-words of all the memes the user v has ever posted. The interest of a user v in a meme m may be determined by ascertaining the similarity between the user and the meme. More particularly, the similarity between a user v and a meme, or between two memes, can be determined by ascertaining the similarity between the two different sets of tokens/words. The similarity between two different bags-of-words may be computed by ascertaining a cosine similarity of their bags-of-words. Finally, we may also consider an extended representation of a meme, in which we concatenate all the bags-of-words representing the users who first reposted that meme. More particularly, it may be desirable to use the extended representation of a meme for images. It is important to note that these examples are merely illustrative, and other representations of memes may be generated.

Influence

The system may determine a probability for a user, for each of the plurality of items, that the user will repost the one of the plurality of items based, at least in part, on a probability of influence of a previous poster of that item on the user. The probability of influence of a particular poster on the user may be based, at least in part, on a probability that the user will repost an item that has been posted by that poster.

In addition, the system may determine a probability for each of one or more followers of the user, for each of a plurality of items, that the corresponding one of the followers of the user will repost the one of the plurality of items based, at least in part, on a probability of influence of the user on the one of the plurality of followers. The probability of influence of the user on a particular follower may be based, at least in part, on a probability that the follower will repost an item that has been posted by the user.

In accordance with various embodiments, the influence exerted by the user u on follower v may be defined by considering that each meme posted by u has a fixed probability of being reposted by v. When a repost occurs, this can be considered a successful case of influence. Each attempt at exerting influence on a follower, that is each meme posted by u, can be viewed as a Bernoulli trial. The Maximum Likelihood Estimator (MLE) of success probability is the ratio of number of successful attempts (i.e., the number of reposts of follower v of a meme posted by user u) over the total number of trials (i.e., the number of posts by u). Therefore, the probability of influence of u on v may be estimated as:

$$\text{influence}(u, v) = \frac{|\{m \in M \mid \exists\, t \in T : \text{repost}(v, u, m, t)\}|}{|\{m \in M \mid \exists\, t \in T : \text{post}(u, m, t)\}|}$$

Time

The system may determine a probability for each of one or more followers v of a user u, for each of a plurality of items, that the corresponding one of the followers of the user will repost the one of the plurality of items based, at least in part, on an amount of time that has passed since the user has posted the one of the plurality of items. In accordance with various embodiments, a time independent repost probability may be learned from the probability that the user v is interested in a particular meme m, denoted by interest(m, v), and the probability of influence of u on v, denoted by influence(u, v). More particularly, a training dataset including data obtained as a result of positive instances (reposts by v of meme posted by u) and negative instances (where v does not repost a meme posted by u). Logistic regression may then be performed on the dataset to learn a time independent repost probability $p_{u,v}^m$. Time can be incorporated by means of a step function.

In one embodiment, the repost probability p(repost(v, u, m, t)) remains equals to $p_{u,v}^m$, for an interval of time $\tau_v$, then it drops to a non-null but very small $\epsilon$. The time interval length $\tau_v$ may represent the ceiling of the average elapsed time, observed in the data, between a post by a user u that is followed by v, and its repost by v. More precisely, where $t_u$ represents the time at which u posted m, we can define the time dependent repost probability as follows:

$$\text{prob}(\text{repost}(v, u, m, t)) = \begin{cases} \max(p_{u,v}^m, \varepsilon) & \text{if } t - t_u \leq \tau_v; \\ \epsilon & \text{otherwise.} \end{cases}$$

Selection of Memes

In accordance with various embodiments, for a user (e.g., original poster or follower) v at time t, k memes may be selected. The memes may be selected, in part, based upon the likelihood that v will post (or repost) the meme that is presented. In addition, the k memes may be selected, at least in part, based upon the likelihood of one or more followers of the user v reposting the memes. More particularly, the memes may be selected, at least in part, based upon the likelihood of the user v's immediate follower(s) reposting the memes.

Selecting a Number of Followers

A number n of immediate followers of the user (or follower) v may be selected for computing probability measures over the selected followers. It is then possible to select k memes that are more likely to be reposted by the followers of v. In order to make the heuristics computationally lightweight, a fixed number n of followers of v can be selected and the probability measures may be aggregated over the set of selected followers. The larger the number of followers, the better the meme rank quality, but the method is more computationally expensive. Therefore, the number of followers n that is selected is a trade-off between quality and efficiency. In accordance with various embodiments, the number of followers n may be between approximately 10 and 30.

For the set F of n followers the average probability of reposting the meme m that has been reposted by v may be represented as follows:

$$f(v,m) = AV\ G_{u \in F} \text{prob}(\text{repost}(v,u,m,t))$$

Therefore, the system may determine, for each of the plurality of items, an average probability that the one or more followers of the user will repost the one of the plurality of items. In some instances, it may be desirable to select a subset of the plurality of items that the one or more followers of the user have a highest average probability of reposting. In other embodiments, the subset of the plurality of items may be further selected, at least in part, on the probability of the user u posting (or reposting) the items, as will be described in further detail below.

The n followers of a given user may be selected according to various strategies. The n followers may be randomly selected. Alternatively, the top-n followers that have the largest number of followers may be selected. The top-n followers that in the past have received the largest number of reposts may, alternatively, be selected. In this manner, a subset of a plurality of followers of a particular user may be selected.

Selecting k Memes

The k memes to be shown to a user v may be selected based upon various probabilities that have been computed. For a user (e.g., follower) v at time t, we can consider all memes m∈cand(v, t) and we may select the k which exhibits the best value for the user v when combining the repost probability (e.g., the time dependent repost probability) of user v reposting a meme posted by user u, denoted by prob(repost(v, u, m, t), and the average probability of others (e.g., immediate followers of v) reposting the meme m that has been posted by v, denoted by f(v,m). The system may combine these two probabilities in order to select a set of memes to present to the user v by means of Borda counting.

For example, suppose |cand(v, t)|=z, then the best meme m with respect to the average probability of others reposting the meme that has been posted by v, f(v, m), takes z points, the second-best takes z−1 points, the third-best takes z−2 points and so on. Borda counting may also be applied with respect to the time dependent repost probability of follower v reposting a meme posted by user u, prob(repost(v, u, m, t). Then for each mememecand(v, t) we may sum the points obtained for f(v,m) with the points obtained for prob(repost (v, u, m, t). The k memes having the highest number of points may then be selected.

Figure 3:
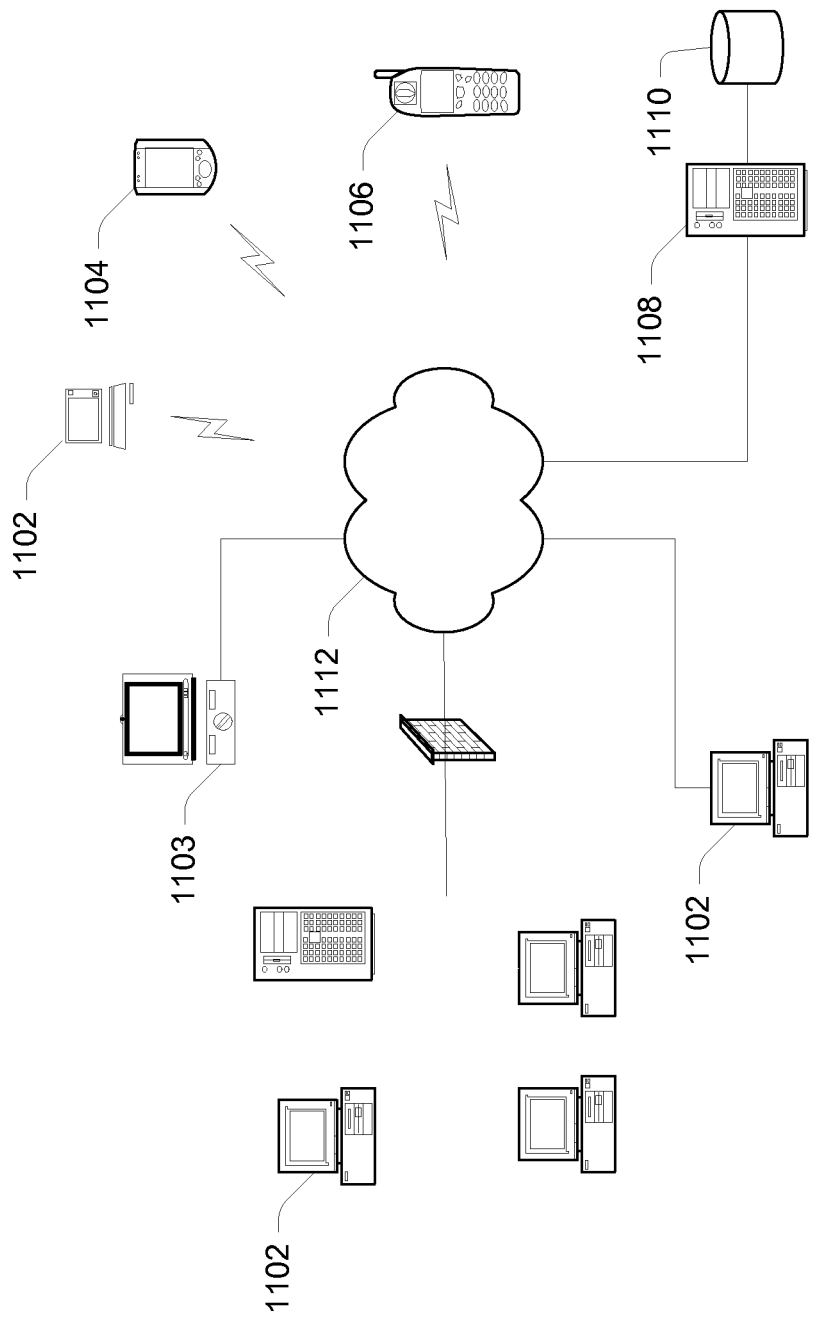
FIG. 3 is a simplified diagram of an example network environment in which various embodiments may be implemented.

The disclosed embodiments may be implemented in any of a wide variety of computing contexts. For example, as illustrated in FIG. 3, implementations are contemplated in which users interact with a diverse network environment via any type of computer (e.g., desktop, laptop, tablet, etc.) 1102, media computing platforms 1103 (e.g., cable and satellite set top boxes and digital video recorders), handheld computing devices (e.g., PDAs) 1104, cell phones 1106, or any other type of computing or communication platform.

And according to various embodiments, input that is processed in accordance with the invention may be obtained using a wide variety of techniques. For example, a query may be obtained via a graphical user interface from a user's interaction with a local application, web site or web-based application or service and may be accomplished using any of a variety of well known mechanisms for obtaining information from a user. However, it should be understood that such methods of obtaining input from a user are merely examples and that a search query may be obtained in many other ways.

A list of items such as Internet memes may be provided according to the disclosed embodiments in some centralized manner. This is represented in FIG. 3 by server 1108 and data store 1110 which, as will be understood, may correspond to multiple distributed devices and data stores. The invention may also be practiced in a wide variety of network environments (represented by network 1112) including, for example, TCP/IP-based networks, telecommunications networks, wireless networks, etc. In addition, the computer program instructions with which embodiments of the invention are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques of the present invention may be implemented in any suitable combination of software and/or hardware system, such as a web-based server or desktop computer system. Moreover, a system implementing various embodiments of the invention may be a portable device, such as a laptop or cell phone. The search apparatus and/or web browser of this invention may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, categories or content types to be displayed in association with the disclosed methods, search results, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 4:
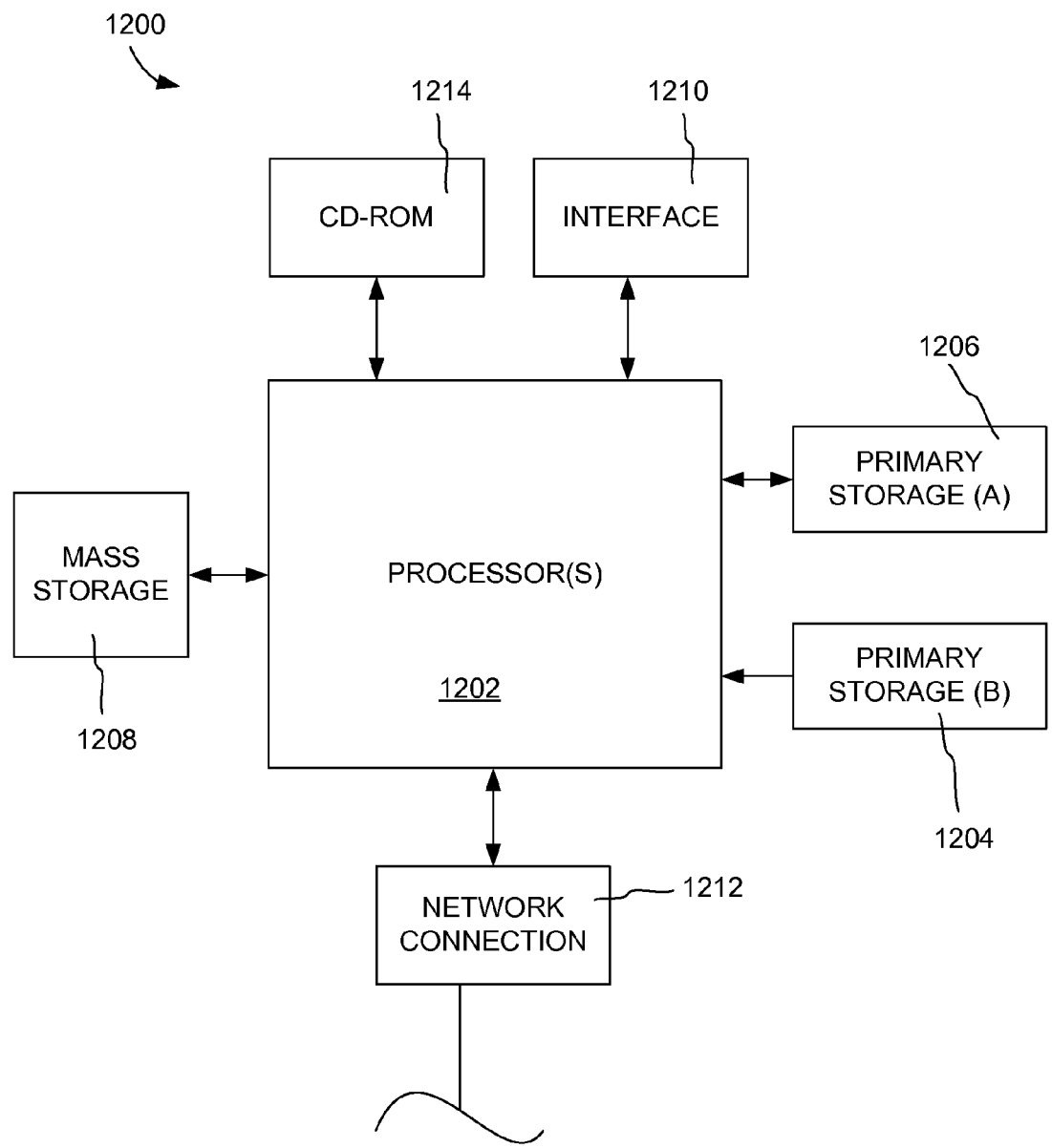
FIG. 4 illustrates an example computer system in which various embodiments may be implemented.

FIG. 4 illustrates a typical computer system that, when appropriately configured or designed, can serve as a system of this invention. The computer system 1200 includes any number of processors 1202 (also referred to as central processing units, or CPUs) that are coupled to storage devices including primary storage 1206 (typically a random access memory, or RAM), primary storage 1204 (typically a read only memory, or ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
    identifying, by one or more servers, a user connected to a network;
    for each of a plurality of items, determining a probability that the user will post or repost the one of the plurality of items;
    for each of the plurality of items, determining, by the one or more servers, for each of one or more followers of the user, a probability that the corresponding one of the followers of the user will repost the one of the plurality of items if the user were to post the one of the plurality of the plurality of items, wherein determining for each of one or more followers of the user, a probability that the corresponding one of the followers of the user will repost the one of the plurality of items is based, at least in part, on a probability of influence of the user on the one of the plurality of followers and a likelihood that the one of the followers of the user will be interested in the one of the plurality of items;
    for each of the plurality of items, for each of the one or more followers of the user, determining for each of a set of followers of the follower of the user, a probability that the corresponding one of the set of followers of the follower of the user will repost the one of the plurality of items if the follower of the user were to post the one of the plurality of the plurality of items, wherein determining for each of the set of followers of the follower of the user, a probability that the corresponding one of the set of followers of the follower of the user will repost the one of the plurality of items is based, at least in part, on a probability of influence of the follower of the user on the one of the set of followers and a likelihood that the one of the set of followers of the follower of the user will be interested in the one of the plurality of items;
    selecting, by the one or more servers, a number of the plurality of items based, at least in part, on (1) the probability, for each of the plurality of items, that the user will post or repost the one of the plurality of items, (2) the probability that has been determined, for each of the plurality of items, for each of the one or more followers of the user, that the corresponding one of the followers of the user will repost the one of the plurality of items if the user were to post the one of the plurality of items, wherein the user has not posted the one of the plurality of items, and (3) the probability that has been determined, for each of the plurality of items, for each of the one or more followers of the user, for each of the set of followers of the follower of the user, that the corresponding one of the set of followers of the follower of the user will repost the one of the plurality of items if the follower of the user were to post the one of the plurality of items; and
    providing the selected number of the plurality of items for presentation to the user;
    wherein each of the plurality of items is an Internet meme.

2. The method as recited in claim 1, further comprising:
    determining the likelihood for each of the one or more followers of the user, that the corresponding one of the followers of the user will be interested in the one of the plurality of items.

3. The method as recited in claim 1, wherein the probability of influence of the user on the one of the plurality of followers is based, at least in part, on a probability that the one of followers will repost an item that has been posted by the user.

4. The method as recited in claim 1, wherein selecting a number of the plurality of items is performed using Borda counting.

5. The method as recited in claim 1, wherein the relationship is a one-way relationship.

6. The method as recited in claim 1, wherein the plurality of items do not include items that were previously posted by the user.

7. The method as recited in claim 1, further comprising:
    for each of the one or more followers of the user, determining a probability of influence of the user on the one of the plurality of followers using a training dataset, the training dataset including data corresponding to positive instances in which the one of the followers re-posts an item posted by the user and data corresponding to negative instances in which the one of the followers does not re-post an item posted by the user.

8. The method as recited in claim 1, wherein determining for each of one or more followers of the user is performed recursively for followers of each of the followers of the user.

9. The method as recited in claim 1, further comprising:
    identifying, by the one or more servers, the plurality of items from social networking platforms that offer microblogging features.

10. The method as recited in claim 1, further comprising:
    selecting, by the one or more servers, the one or more followers of the user from a plurality of followers of the user based, at least in part, on at least one of a number of followers of each of the plurality of followers of the user or a number of reposts received by each of the plurality of followers of the user.

11. The method as recited in claim 1, further comprising:
    for each of the one or more followers of the user, for each of the plurality of items, determining the likelihood, by the one or more servers, that the one of the followers of the user will be interested in the one of the plurality of items based, at least in part, upon a first set of words associated with the one of the plurality of items and a second set of words associated with items previously posted by the one of the followers of the user.

12. The method as recited in claim 1, wherein each of the followers of the user has opted-in to a relationship with the user, enabling the followers to view or otherwise access items posted by the user.

13. The method as recited in claim 1, further comprising:
    analyzing a propagation tree representing post/repost probabilities of users and their followers in association with particular items.

14. A non-transitory computer-readable medium storing thereon computer-readable instructions, comprising:
    instructions for identifying a user connected to a network;
    instructions for determining for each of a plurality of items, a probability that the user will post or repost the one of the plurality of items;
    instructions for determining, for each of the plurality of items, a probability for each of one or more followers of the user, that the corresponding one of the followers of the user will repost the one of the plurality of items if the user were to post the one of the plurality of the plurality of items, wherein determining for each of one or more followers of the user a probability that the corresponding one of the followers of the user will repost the one of the plurality of items is based, at least in part, on a probability of influence of the user on the one of the plurality of followers and a likelihood that the one of the followers of the user will be interested in the one of the plurality of items;

instructions for determining, for each of the plurality of items, for each of the one or more followers of the user, for each of a set of followers of the follower of the user, a probability that the corresponding one of the set of followers of the follower of the user will repost the one of the plurality of items if the follower of the user were to post the one of the plurality of the plurality of items, wherein determining for each of the set of followers of the follower of the user, a probability that the corresponding one of the set of followers of the follower of the user will repost the one of the plurality of items is based, at least in part, on a probability of influence of the follower of the user on the one of the set of followers and a likelihood that the one of the set of followers of the follower of the user will be interested in the one of the plurality of items;

instructions for selecting a number of the plurality of items based, at least in part, on (1) the probability, for each of the plurality of items, that the user will post or repost the one of the plurality of items, (2) the probability that has been determined, for each of the plurality of items, for each of the one or more followers of the user, that the corresponding one of the followers of the user will repost the one of the plurality of items if the user were to post the one of the plurality of the plurality of items, wherein the user has not posted the one of the plurality of items, and 3) the probability, for each of the plurality of items, for each of the one or more followers of the user, for each of the set of followers of the follower of the user, that the corresponding one of the set of followers of the follower of the user will repost the one of the plurality of items if the follower of the user were to post the one of the plurality of items; and instructions for providing the selected number of the plurality of items for presentation to the user;

wherein each of the plurality of items is an Internet meme.

15. The non-transitory computer-readable medium as recited in claim 14, further comprising:

instructions for determining, for each of the plurality of items, an average probability that the one or more followers of the user will repost the one of the plurality of items;

instructions for selecting the number of the plurality of items based, at least in part, on the average probability that the one or more followers of the user will repost the one of the plurality of items.

16. The non-transitory computer-readable medium as recited in claim 15, further comprising:

instructions for determining the likelihood, for each of the one or more followers of the user, for each of the plurality of items, that the one of the followers of the user will be interested in the one of the plurality of items based, at least in part, upon a first set of words associated with the one of the plurality of items and a second set of words associated with items previously posted by the one of the followers of the user.

17. The non-transitory computer-readable medium as recited in claim 15, wherein each of the followers of the user has opted-in to a relationship with the user, enabling the followers to view or otherwise access items posted by the user.

18. The non-transitory computer-readable medium as recited in claim 15, further comprising:

instructions for determining, for each of the one or more followers of the user, a probability of influence of the user on the one of the plurality of followers using a training dataset, the training dataset including data corresponding to positive instances in which the one of the followers re-posts an item posted by the user and data corresponding to negative instances in which the one of the followers does not re-post an item posted by the user.

19. The non-transitory computer-readable medium as recited in claim 14, wherein the plurality of items include different types of items.

20. The non-transitory computer-readable medium as recited in claim 14, wherein each of the plurality of items includes a digital file or hypertext link.

21. The non-transitory computer-readable medium as recited in claim 14, wherein each of the plurality of items corresponds to a digital file including at least one of text, an image, audio, or video.

22. An apparatus, comprising:

a processor; and a memory, at least one of the processor or the memory being adapted for:

identifying a user connected to a network;

for each of a plurality of items, determining a probability that the user will post or repost the one of the plurality of items;

determining, for each of the plurality of items, a probability for each of one or more followers of the user, that the corresponding one of the followers of the user would repost the one of the plurality of items if the user were to post the one of the plurality of items, wherein determining for each of one or more followers of the user, a probability that the corresponding one of the followers of the user will repost the one of the plurality of items is based, at least in part, on a probability of influence of the user on the one of the plurality of followers and a likelihood that the one of the followers of the user will be interested in the one of the plurality of items;

for each of the plurality of items, for each of the one or more followers of the user, determining for each of a set of followers of the follower of the user, a probability that the corresponding one of the set of followers of the follower of the user will repost the one of the plurality of items if the follower of the user were to post the one of the plurality of the plurality of items, wherein determining for each of the set of followers of the follower of the user, a probability that the corresponding one of the set of followers of the follower of the user will repost the one of the plurality of items is based, at least in part, on a probability of influence of the follower of the user on the one of the set of followers and a likelihood that the one of the set of followers of the follower of the user will be interested in the one of the plurality of items;

selecting a subset of the plurality of items based, at least in part, on 1) the probability that the user will post or repost the one of the plurality of items, 2) the probability, for each of the plurality of items, for each of the one or more followers of the user, that the corresponding follower of the user would repost the corresponding one of the plurality of items if the user were to post the one of the plurality of items, wherein the user has not posted the one of the plurality of items, and 3) the probability, for each of the plurality of items, for each of the one or more followers of the user, for each of the set of followers of the follower of the user, that the corresponding one of the set of followers of the follower of the user will repost the one of the plurality of items if the follower of the user were to post the one of the plurality of items; and providing the selected subset of the plurality of items for presentation to the user;

wherein each of the plurality of items is an Internet meme.

23. The apparatus as recited in claim 22, at least one of the processor or the memory being adapted for:

analyzing a propagation tree representing post/repost probabilities of users and their followers in association with particular items.

24. The apparatus as recited in claim 23, at least one of the processor or the memory being adapted for:

maximizing a size of sub-trees of the propagation tree.

25. The apparatus as recited in claim 22, wherein the network is a social network.

26. The apparatus as recited in claim 22, wherein identifying is performed when the user logs in to the network.

27. The apparatus as recited in claim 22, further comprising:

selecting the one or more followers from a plurality of followers of the user.

28. The apparatus as recited in claim 22, at least one of the processor or the memory being further adapted for:

for each of the one or more followers of the user, for each of the plurality of items, determining the likelihood that the one of the followers of the user will be interested in the one of the plurality of items based, at least in part, upon a first set of words associated with the one of the plurality of items and a second set of words associated with items previously posted by the one of the followers of the user.

29. The apparatus as recited in claim 22, wherein each of the followers of the user has opted-in to a relationship with the user, enabling the followers to view or otherwise access items posted by the user.

30. The apparatus as recited in claim 22, wherein the probability of influence of the user on the one of the plurality of followers is based, at least in part, on a probability that the one of followers will repost an item that has been posted by the user.

* * * * *